US012242452B2

United States Patent
Yu et al.

(10) Patent No.: US 12,242,452 B2
(45) Date of Patent: Mar. 4, 2025

(54) TEXT-BASED MACHINE LEARNING EXTRACTION OF TABLE DATA FROM A READ-ONLY DOCUMENT

(71) Applicant: Coupa Software Incorporated, San Mateo, CA (US)

(72) Inventors: Hongyang Yu, Wentworth Point (AU); Hanieh Borhanazad, Sydney (AU); Sandip Mandlecha, Pune (IN)

(73) Assignee: Coupa Software Incorporated, San Mateo, CA (US)

( * ) Notice: Subject to any disclaimer, the term of this patent is extended or adjusted under 35 U.S.C. 154(b) by 0 days.

(21) Appl. No.: 18/415,062

(22) Filed: Jan. 17, 2024

(65) Prior Publication Data

US 2024/0160616 A1   May 16, 2024

Related U.S. Application Data

(63) Continuation of application No. 17/973,511, filed on Oct. 25, 2022, now Pat. No. 11,914,567, which is a continuation of application No. 17/074,957, filed on Oct. 20, 2020, now Pat. No. 11,500,843.

(30) Foreign Application Priority Data

Sep. 2, 2020 (IN) .............................. 202011037847

(51) Int. Cl.
*G06F 16/22* (2019.01)
*G06F 16/93* (2019.01)
*G06N 3/045* (2023.01)
*G06V 30/412* (2022.01)
*G06V 30/414* (2022.01)

(52) U.S. Cl.
CPC .......... *G06F 16/2282* (2019.01); *G06F 16/93* (2019.01); *G06N 3/045* (2023.01); *G06V 30/412* (2022.01); *G06V 30/414* (2022.01)

(58) Field of Classification Search
CPC ... G06F 16/2282; G06F 16/93; G06V 30/414; G06V 10/82; G06N 3/08; G06N 3/045; G06N 3/412
See application file for complete search history.

(56) References Cited

U.S. PATENT DOCUMENTS

| 10,878,173 B2 * | 12/2020 | Morariu | .......... G06V 30/19173 |
| 2003/0028503 A1 * | 2/2003 | Giuffrida | ................ G06F 16/30 |
| 2013/0033390 A1 | 2/2013 | Hoshikawa et al. | |
| 2018/0203984 A1 | 7/2018 | Agrawal et al. | |
| 2019/0087444 A1 * | 3/2019 | Arakawa | .............. H04N 1/4074 |
| 2021/0241331 A1 | 8/2021 | Katzenelson et al. | |

* cited by examiner

*Primary Examiner* — Etienne P Leroux
(74) *Attorney, Agent, or Firm* — Baker Botts L.L.P.

(57) ABSTRACT

Embodiments of the disclosed technologies provide solutions for automatically reading digital electronic documents that contain tables and correctly extracting table data, rows and columns from the documents with high accuracy and high throughput. Embodiments are capable of converting a table portion of a read-only document to a searchable, editable data record using text rectangle (TR)-level numerical data that indicates probabilities of TRs belonging to canonicals and at least one convolutional neural network (CNN) that processes the TR-level numerical data to produce table-level numerical data.

20 Claims, 9 Drawing Sheets

TEXT-BASED MACHINE LEARNING EXTRACTION OF TABLE DATA FROM A READ-ONLY DOCUMENT

BENEFIT CLAIM

This application claims the benefit under 35 U.S.C. § 120 as a continuation of application Ser. No. 17/973,511, filed Oct. 25, 2022, which claims the benefit under 35 U.S.C. § 120 as a continuation of application Ser. No. 17/074,957, filed Oct. 20, 2020, which claims the benefit of India application 202011037847, filed Sep. 2, 2020, the entire contents of which are hereby incorporated by reference for all purposes as if fully set forth herein. Applicant hereby rescinds any disclaimer of scope that occurred during the prosecution of the priority application(s) and advises the USPTO that the claims of this application may be broader than in any priority application(s).

TECHNICAL FIELD

One technical field to which this disclosure relates is computer software for fully automated text-based table extraction from a read-only electronic document.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2020 Coupa Software, Inc.

BACKGROUND

The developments described in this section are approaches that could be pursued, but not necessarily approaches that have been previously conceived or pursued. However, unless otherwise indicated, it should not be assumed that any of the developments described in this section qualify as prior art, or that these developments are generally known to a person of ordinary skill in the art.

Table extraction is a process by which a computer automatically recognizes a table that contains rows and columns of data in a read-only document and converts the table to a structured data record. Known automated table extraction algorithms are image-based; that is, they rely on the detection of visual cues in the raw image data of the read-only document, such as printed or typed visual lines or other markings that separate the rows and columns of a table, to locate and extract the table data from the read-only document. Rule-based extraction relies heavily on human-derived, fixed heuristics to inspect text and detect tables. Other known approaches use optical character recognition (OCR). Still other known techniques are template-driven, where the template is created by a human manually identifying the types and location of data in the table. Template-driven and OCR approaches are not fully automated as end-to-end solutions.

SUMMARY

The appended claims may serve as a summary of the present invention.

While the present invention is amenable to various modifications and alternative forms, specific embodiments are shown by way of example in the drawings and are described in detail. However, the drawings and description are not intended to limit the invention to the forms disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth to provide a more thorough understanding of the present invention. It will be apparent, however, that the present invention may be practiced without these specific details. In the drawings, the depiction of structures and devices may be simplified to avoid unnecessarily obscuring the present invention.

Overview

1. Technical Problems

A significant drawback of fully automated image-based table extraction algorithms, and rule-based approaches, is that they are unable to understand the content of a table well enough to perform higher level information extraction. For example, known image-based approaches cannot determine whether a particular column of a table contains text description or numerical quantity data. These limitations are primarily due to the sole usage of raw image pixels of the read-only document as feature input to a neural network. Additionally, processing raw image pixels and outputting pixel-level classifications in order to separate columns and rows requires an extremely large neural network, which is both hard to train and expensive to host.

2. Technical Challenges

The technical problems outlined above have raised specific technical challenges to fully automating the table extraction process. For example, it has been a technical challenge for computers to automatically locate a table within a document that contains other content, such as other text and/or graphics. It has also been a technical challenge for computers to assign elements of table data to the correct rows and columns. Another technical challenge has been for computers to determine the semantics of table column data; that is, the kind of data the column contains, without human intervention. Yet another technical challenge has been for computers to automatically recognize when a table cell contains wrapped text, so as to keep the wrapped lines of text together in the same cell while accurately counting the number of rows in the table.

3. Technical Solutions that Address Technical Problems and Challenges

The disclosed technologies address the above technical problems and challenges. Embodiments are structured and programmed to perform higher level information extraction using text-level information extracted from a read-only document. Embodiments use a hierarchical process involving a combination of small machine learning models, such as small neural networks, to generate text-level numerical data. Small neural networks are easier to train and less costly to run. The text-level numerical data is used to create a feature map that can be processed by a convolutional neural network more easily than the raw image pixel data of a read only document. Embodiments are capable of performing fully automated, end-to-end table extraction without using raw image pixel data of the read-only document and without requiring the use of OCR. Some embodiments can use OCR in combination with the disclosed approaches to deploy an even more powerful extraction system that does not rely on the availability of text-level information.

Rather than using the raw image pixel data of the read-only document, embodiments of the disclosed technologies perform feature engineering on text rectangle information extracted from the read-only document to create a feature map that is then used as input to a machine learning model, such as a convolutional neural network (CNN). As explained in more detail below, pixel brightness at a particular location in the feature map corresponds to a probabilistic likelihood that text at the corresponding location in the read-only document belongs to a particular table canonical. In this way, the feature map created by the disclosed technologies encodes both spatial and semantic information about the table portion of the read-only document, thereby preserving both the physical structure of the table and the semantics of the table contents during the conversion of the read-only table to a searchable, editable data record.

4. Benefits

The disclosed technologies fully automate the table extraction process in a computationally efficient manner. Because the disclosed technologies can achieve higher-level information extraction on row and column data, no manual intervention is required to assign table data to the proper rows and columns or to associate table data with the correct data types. As a result, table line item data can be accurately extracted from a read-only document, assigned to the appropriate rows, columns, and data types, and stored in an editable, searchable database using a fully automated process.

In one particular implementation, the disclosed technologies are used to fully automate the processing of Portable Document Format (PDF) files that contain tables. For example, PDF files may be received from a network via a message interface, such as an inbox. Receipt of a PDF file of a certain type into the inbox may kick off the fully automated table extraction process, with the end result being the creation, by the computer, of a searchable, editable data record that contains the table line item data. The data record is then stored in a database and available for querying, editing, and other downstream functions of the application software.

Computing System—Example Embodiment

Figure 1:
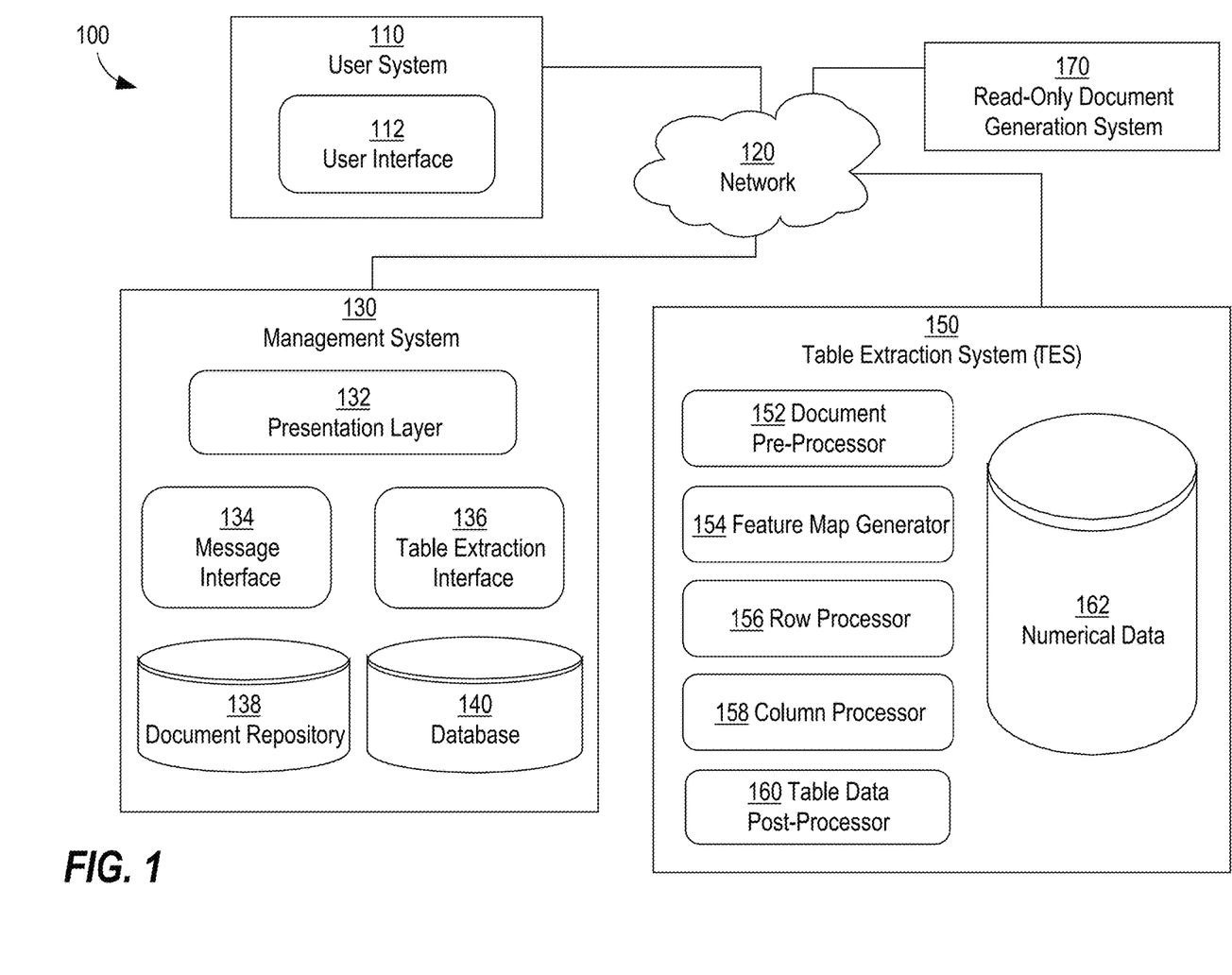
FIG. 1 is a block diagram illustrating at least one embodiment of a computing system in which aspects of the present disclosure may be implemented.

FIG. 1 illustrates a computing system in which embodiments of the features described in this document can be implemented. In the embodiment of FIG. 1, computing system 100 includes a user system 110, a management system 130, a table extraction system (TES) 150, and a read-only document generation system 170.

User system 110 includes at least one computing device, such as a personal computing device, a server, a mobile computing device, or a smart appliance. User system 110 includes at least one software application, including a user interface 112. For example, user interface 112 may be or include front-end portions of management system 130 and/ or TES 150 and/or read-only document generation system 170.

In an embodiment, user interface 112 is any type of user interface software, including a graphical user interface or a combination of a voice interface and a graphical user interface. User interface 112 may be used to create, view, edit, or process a digital document and/or perform operations within management system 130, such as querying, data review, data entry, report generation, responding to notifications, and the like. Alternatively or in addition, user interface 112 may provide an application program interface (API) that allows executing programs or processes of the user system 110 to make documents available for processing by management system 130 and/or TES 150.

A digital read-only document can be created by a user using, for example, read-only document generation system 170. An example of a read-only document is a document stored in the PDF format or another type of read-only, application software-agnostic format. The term user, as used herein, may refer to at least one human person interacting with a computing device, or may refer to an automated process. For instance, a bot, a personal digital assistant, or a robot may be a user, in some embodiments.

Management system 130 is bi-directionally communicatively coupled to at least user system 110 and TES 150 by network 120. In an embodiment, management system 130 is a cloud-based procurement system. In other embodiments, management system 130 may be another type of transaction management system.

Management system 130 collects, stores, and manages transactional data related to transactions between entities and counterparty entities, such as procurement transactions between buyer entities and supplier entities or other related parties that have user accounts registered in the management system 130. Multiple instances of the management system 130 include, for example, different instances respectively operated by different entity and counterparty user accounts, such as buyer entity user accounts and supplier entity user accounts.

An instance of the management system 130 includes an instance that one of the entity user accounts operates. In an embodiment, the management system 130 is an e-procurement system. For example, management system 130 may include portions of the COUPA SPEND MANAGEMENT software platform provided by Coupa Software of San Mateo, California.

In the embodiment of FIG. 1, management system 130 includes presentation layer 132, message interface 134, TES interface 136, document repository 138, and database 140.

Presentation layer 132 is embodied as computer programming code stored in computer memory that when executed causes a computing device to operate management system 130. Presentation layer 132 is in bidirectional digital communication with message interface 134, TES interface 136, document repository 138, and database 140 as needed to operate management system 130.

In an embodiment, presentation layer 132 is a server-side web application framework that generates portions of user interface 112 and through which portions of management system 130, including message interface 134, and table extraction interface 136, document repository 138, and database 140 are made accessible to registered users of entities and counterparty entities. While not specifically shown, it should be understood that management system 130 may also include one or more interfaces for querying document repository 138 or database 140 and viewing data records stored in database 140, including, for example, a forms interface whereby data records are displayed in a form that contains editable fields.

Message interface 134 is embodied as computer programming code stored in computer memory that when executed causes a computing device to enable bidirectional communication between management system 130 and user system 110 and/or read-only document generation system 170. In an embodiment, message interface 134 is configured to receive messages that contain read-only documents, store the received read-only documents in document repository 138, and display the messages and/or read-only document information in an inbox style user interface. Message interface 134 may initiate a table extraction process by making a call to TES 150 through table extraction interface 136, in response to receiving a read-only document in an inbox.

TES interface 136 is embodied as computer programming code stored in computer memory that when executed causes a computing device to enable bidirectional communication between management system 130 and TES 150. For example, output produced by TES 150 may be displayed by a front end of management system 130 or used to inform decisions made by management system 130, and output produced by management system 130 may be displayed by TES 150 or used to inform decisions made by TES 150, via TES interface 136. TES interface 136 may be implemented as, for example, a function call or library call using an application programming interface (API), or as an inter-process communication (IPC) interface. Thus, although not specifically shown, TES 150 may be implemented within management system 130 rather than as a separate component.

Document repository 138 is a data store that stores read-only documents received by message interface 134, including, for example documents relating to transactions involving entities such as buyers and suppliers. Examples of read-only documents that may be stored in document repository 138 include PDF invoices, statements of account, reports, and other documents that contain tabular information. Document repository 138 is implemented as a searchable file system.

Database 140 is a data store that stores data records produced by TES 150, which contain data extracted from read-only documents received by message interface 134. Database 140 is implemented as a searchable database system, such as a graph-based database system or a table-based relational database system or a hierarchical database system. Database 140 may include numerous searchable, editable data records, where any data record may store data that includes data extracted by TES 150 from one or more read-only documents.

Table extraction system (TES) 150 is a computer system or subsystem that provides automated table extraction functionality using the approaches described herein. In some embodiments, TES 150 is implemented as a back-end portion of management system 130. Portions of TES 150 may be incorporated as additional functions within management system 130 or another application software program. For instance, functionality of TES 150 may be made accessible within a front-end of management system 130 by way of a menu item or a widget.

In the embodiment of FIG. 1, TES 150 includes document pre-processor 152, feature map generator 154, row processor 156, column processor 158, table data post-processor 160, and numerical data 162. Each of document pre-processor 152, feature map generator 154, row processor 156, column processor 158, table data post-processor 160, and numerical data 162 is in bidirectional digital communication with the others as needed to operate TES 150.

Document pre-processor 152 is embodied as computer programming code stored in computer memory that when executed cause a computing device to pre-process a read-only document, extract text rectangle (TR) data from the read-only document, and output TR-level numerical data. Document pre-processor 152 identifies text rectangles based on the amount of spacing between text characters exceeding a threshold amount. For example, when document pre-processor 152 reads a line of the read-only document and encounters an amount of spacing that exceeds the threshold amount, document pre-processor 152 considers the text characters preceding that amount of spacing and occurring after the previous text rectangle, if any, as belonging to the same text rectangle and draws a bounding box around the text that is grouped together in the text rectangle.

TR data extracted from the read-only document includes, for each particular text rectangle of the read-only document, x and y coordinates indicating the height and width dimensions of the text rectangle, the text contents of the text rectangle, and the font size and number of characters inside the text rectangle, in an embodiment.

Figure 4A:
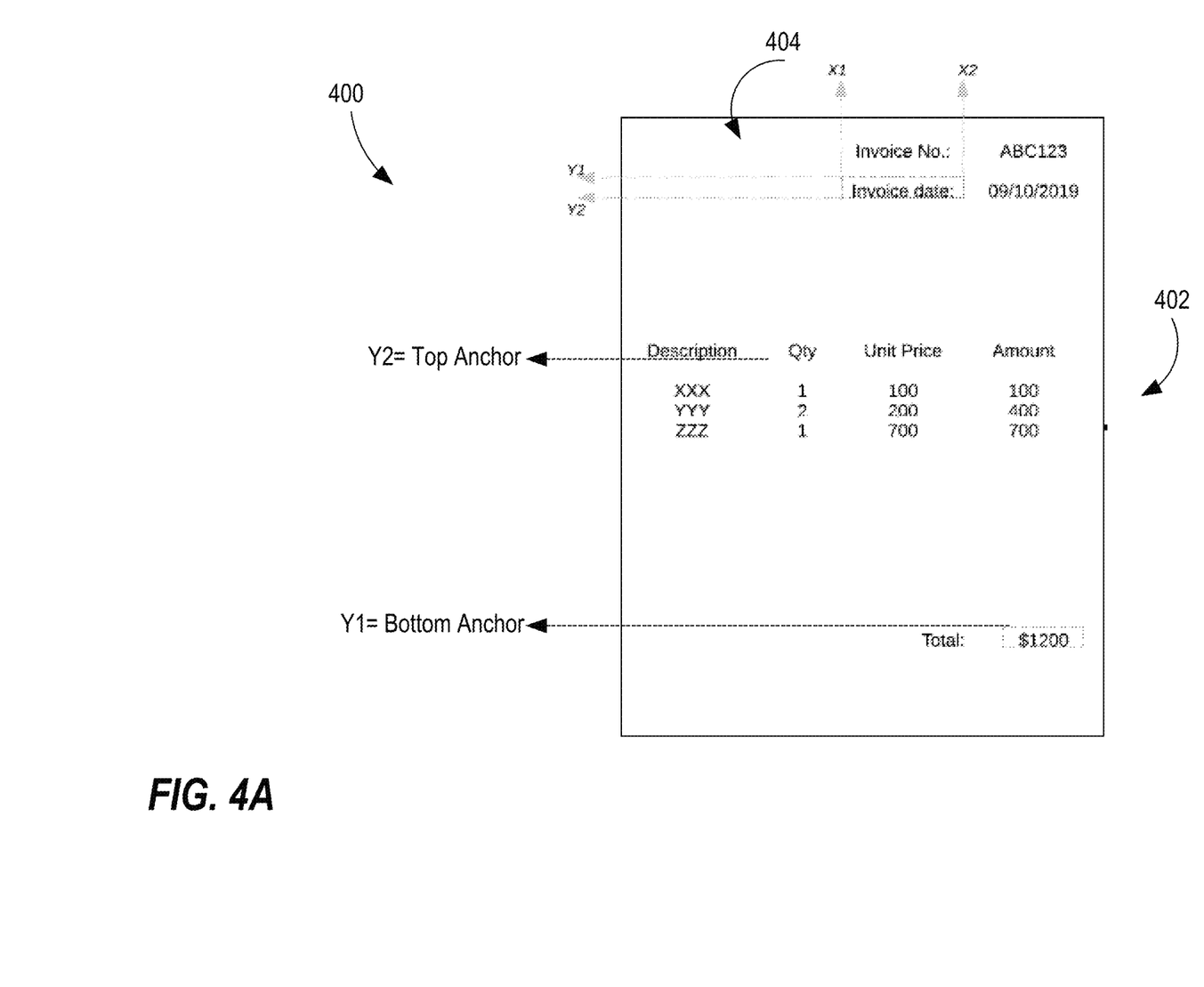
FIG. 4A is an example of a document containing a table portion, which may be processed by at least one device of the computing system of FIG. 1.

The x and y coordinates of a particular text rectangle include two sets of coordinates, X1, Y1, and X2, Y2, where X1 is the beginning or left most corner of the text rectangle, X2 indicates the ending or right-most corner of the text rectangle, Y1 indicates the beginning or top most corner of the text rectangle, and Y2 indicates the ending or bottom-most corner of the text rectangle. Thus, the distance X2 minus X1 indicates the width of the text rectangle, and the distance Y2 minus Y1 indicates the height of the text rectangle. An example of a read-only document showing an example of a text rectangle is shown in FIG. 4A. In the example of FIG. 4A, each text rectangle has coordinates (X1, Y1) and (X2, Y2), and text rectangle 404 contains the content, "Invoice date:."

TR-level numerical data produced by document pre-processor indicates, for each text rectangle, a probabilistic likelihood of the text contained in the text rectangle belonging to a particular text canonical. Examples of text canonicals are label and value. A TR could be a label and a value. Examples of text canonicals include Invoice Number and Invoice Date. In an embodiment, document pre-processor 152 produces the TR-level numerical data using a group of machine learning models, for example, small neural networks, which collectively classify the text rectangle content as belonging to a particular label canonical or a particular value canonical.

As used herein, a "small" neural network may refer to a very shallow neural network, for example a fully connected neural network with only one hidden layer (plus an input layer and an output layer, for a total of three layers). In each case, a threshold value is used to determine whether a text rectangle belongs to a particular canonical. For example, text rectangles having a probability of more than 70% on a scale of 0 to 100% (or 0.7, on a scale of 0 to 1) of belonging to a particular canonical may be considered as belonging to the particular canonical.

In an embodiment, a first small neural network has been trained to classify each text rectangle as either a label or non-label content. In one particular embodiment, the first neural network is a three-layer feed forward neural network trained using TensorFlow with hyperparameters set to default values. In operation, the first neural network takes as input the characters, font size and x and y position of each text rectangle, classifies each text rectangle as either a label or non-label content, and outputs a probability of the text rectangle being a label, with the probability represented as a value between 0 and 1. A classification as a "label" indicates that the content of the text rectangle is a semantic label, such as a column header or field name, while classification as a "not a label" indicates that the content of the text rectangle is a data value rather than a label.

After the first neural network has divided the text rectangles into the two classes, label or not a label, second and third small neural networks process the label and non-label portions of the output of the first neural network, respectively. The structure and training of the second and third neural networks may be convolutional neural networks using both one-dimensional and two-dimensional filters, while the first neural network may be a fully connected shallow network.

The second neural network processes text rectangle data that have been classified by the first neural network as labels and further classifies each text rectangle according to a probability of belonging to a particular label canonical. Examples of label canonicals include "Quantity," "Price," and "Description." The number and types of label canonicals are pre-defined and will vary depending upon the particular application. In some implementations, the number of different label canonicals may be in a range of about 140.

In one particular implementation, the second neural network takes as input the characters, font size, x and y coordinates for each text rectangle and outputs a probability distribution quantifying the likelihood of the text rectangle belonging to each of the pre-defined label canonicals, using a one-dimensional convolution operation that acts as a sliding reader, reading the input characters from left to right.

The third small neural network processes text rectangles that have been classified by the first neural network as not labels and further classifies each text rectangle according to a probability of belonging to a particular value canonical. Examples of value canonicals include numeric, text, currency, date. The number and types of value canonicals will vary depending upon the particular application. The value canonicals include line item canonicals, in an embodiment. Examples of line item canonicals include line item description, amount or quantity, line number and unit price. Additional details of a particular implementation of portions of document pre-processor 152 are described in U.S. patent application Ser. No. 16/835,100, filed Mar. 30, 2020, which is incorporated herein by this reference.

The end result of the operations performed by document pre-processor 152 is, for each text rectangle of the read-only document, TR-level numerical data is determined, where the TR-level numerical data may be embodied as either a label feature probability vector or a value probability feature vector. Because each text rectangle is initially classified as label or non-label, only one of the two possible probability vectors is output for each text rectangle.

Feature map generator 154 is embodied as computer programming code stored in computer memory that when executed causes a computing device to project the output of document pre-processor 152 onto a grid. To do this, feature map generator 154 creates a grid which is superimposed on the read-only document. The grid facilitates retention of the spatial positioning of the table data. Feature map generator 154 maps the text rectangle probability values contained in the label and value feature vectors produced by the second and third neural networks of document pre-processor 152 to corresponding locations on the grid by mapping the text rectangle x, y coordinates to the grid cell locations.

In an embodiment, the grid size is in the range of about g cells by g cells, where each cell has dimensions of c pixels by c pixels, where c corresponds to the minimum font size of the text, for example 8 points, and g is a multiple of c, where the multiplier is determined based on the length and width dimensions of the read-only document. For example, in an embodiment, the multiple may be based on the largest anticipated dimension of a read-only document.

In an embodiment, the coordinates of the text rectangles in the read-only document are stretched in the x and y direction before the read-only document is partitioned using the grid. The stretching process adds space between rows and columns of text, which facilitates the automated assignment of text to the appropriate rows and columns. Stretching the read-only document is particularly helpful when the table contains many columns closely spaced together or many rows with little spacing in between the rows. For example, the coordinates of the text rectangles of the read-only document may be stretched to occupy a feature map of size p by p pixels. In a particular embodiment, p=g multiplied by c.

The stretching and partitioning of the read-only document enables feature map generator 154 to assign text to the correct rows and columns without relying on any visual lines, graphics, or other non-alphanumeric markings in the read-only document. As a result, TES 150 can extract tables from documents even where the rows and columns are not delineated by visual lines or where the visual lines are difficult to detect due to poor quality scanning, light coloring, or other reasons.

To project the TR-level numerical data onto the gird, feature map generator 154 uses the X1, X2, and Y2 values of each text rectangle. For example, the number of row-wise cells of the grid that will be occupied by a text rectangle depends on the X1 and X2 values of the text rectangle. However, each text rectangle will only occupy a single column-wise cell of the grid, which is determined based on its Y2 value. That is, where a text rectangle contains multiple lines of text, only the Y value of the last line of the text, e.g., the Y coordinate of the bottom of the text rectangle, is used to determine which cell of the grid to which the contents of the text rectangle will be assigned. Thus, a text rectangle can occupy more than one cell of the grid in the x direction but only one cell of the grid in the y direction.

After each text rectangle is assigned to a grid location (X1, X2, Y2), the corresponding feature probability vector output by document pre-processor 152 (e.g., a label vector or a value vector) is concatenated onto the grid cell or cells assigned to that text rectangle. If a text rectangle occupies more than one cell, the feature probability vector is concatenated onto each cell occupied by the text rectangle.

Because the feature probability vector is concatenated onto each cell of the grid occupied by the text rectangle, and longer text rectangles occupy more cells of the grid, longer text rectangles will have higher feature weights due to column-wise summation. Higher feature weights could cause row processor 156 to inaccurately conclude that the text rectangle corresponds to a text description. To counter the biasing effect of these higher feature weights, a fading process such as an exponential smoothing or weight decay function is applied to the feature vector in each cell to decouple the length of the text rectangle from its relative importance in the feature tensor.

Figure 4B:
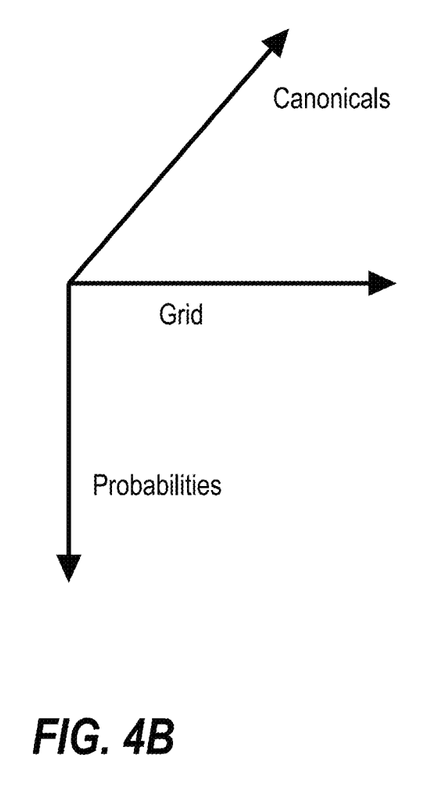
FIG. 4B is a schematic illustration of a three-dimensional tensor that may be created and used by at least one device of the computing system of FIG. 1 in which X and Y directions comprise grids and the Z direction comprises a probability vector.

Concatenation of the feature probability vectors onto the grid produces a three-dimensional tensor. The three-dimensional tensor produced by feature map generator 154 is passed as an input to row processor 156. Thus, the feature map that is created by feature map generator 154 is a three-dimensional plot of canonical probabilities to corresponding grid locations. FIG. 4B shows an example of a structure of the feature map where, for each grid location, there is a set of probabilities indicating the likelihood that the text of the read-only document corresponding to that grid location belongs to a particular canonical. In other words, the feature map contains a probability value for each grid location and canonical pair, where there are multiple possible canonicals for each grid location.

Figure 4C:
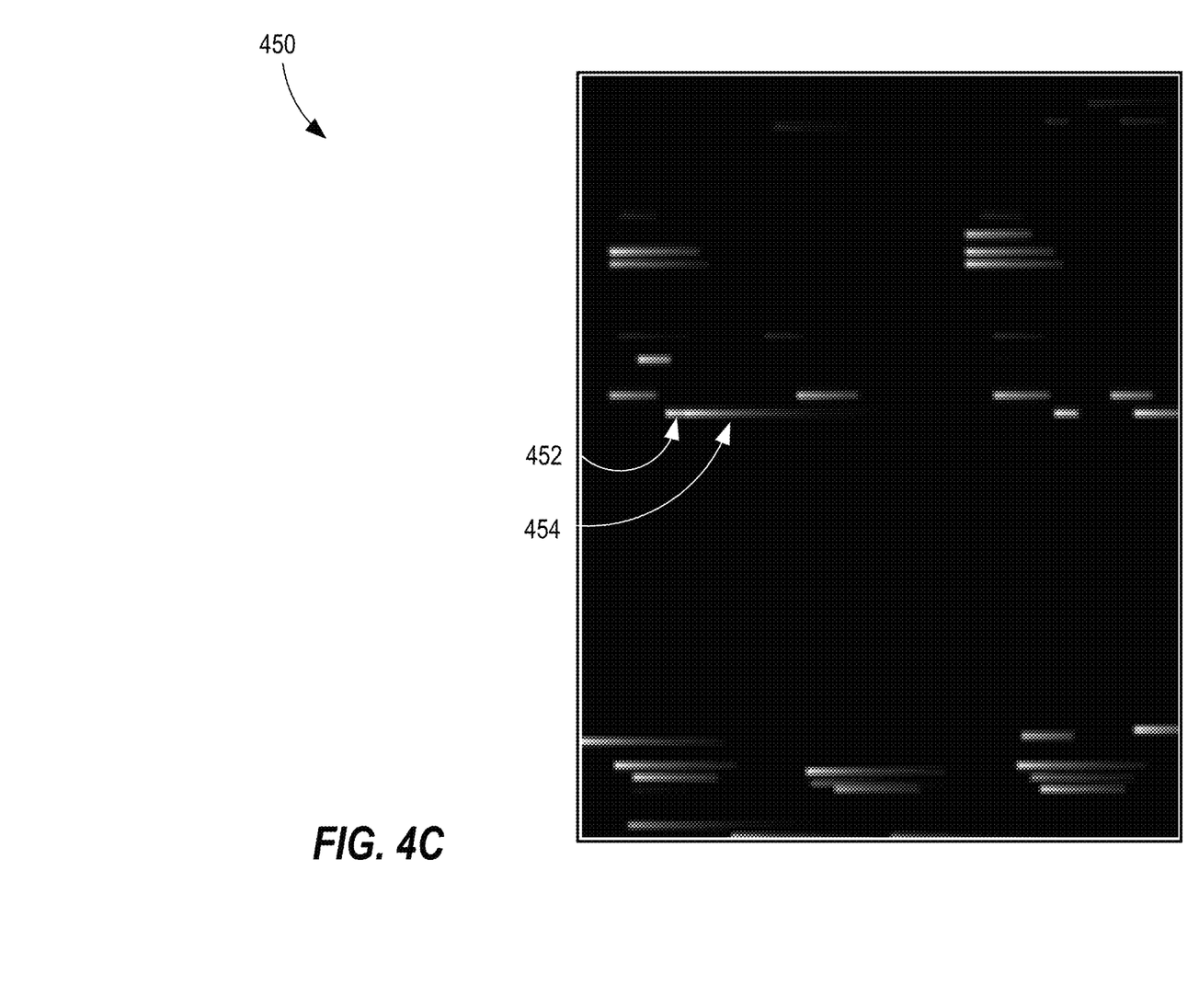
FIG. 4C and FIG. 4D are examples of feature maps that may be created and used by at least one device of the computing system of FIG. 1.
Figure 4D:
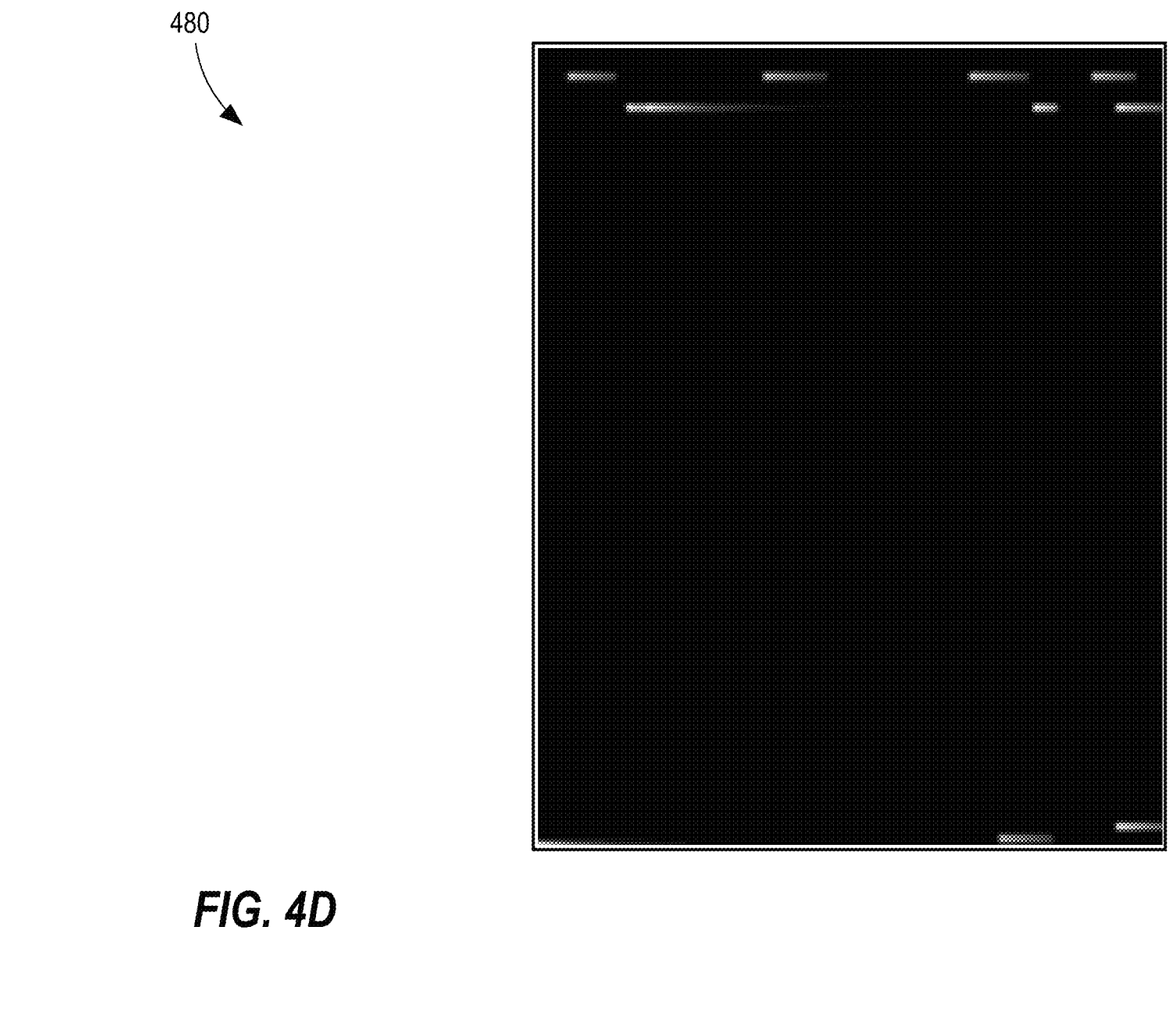

In FIG. 4C and FIG. 4D, a feature map produced by feature map generator 154 is represented in graphical form. FIG. 4C represents a graphical form of the feature map for an entire page of the read-only document, which contains a table portion as well as other text that is outside of the table portion. FIG. 4D is a filtered version of the feature map of FIG. 4C, which excludes information for those areas of the read-only document that are outside of the table portion. As described in more detail below, a feature map such as FIG. 4C is used as input to row processor 156, and a filtered feature map such as FIG. 4D is used as input to column processor 158.

To generate the graphical form of the feature map, feature map generator 154 uses the canonical probabilities as indicators of pixel brightness, so that grid locations with high canonical probabilities are depicted more brightly than grid locations with low canonical probabilities. Dark portions of the feature map indicate spatial separation of table portions.

For example, in FIG. 4C, a head portion 452 of a feature is depicted brightly, indicating a high canonical probability, such as a high probability that the text at grid location of head portion 452 corresponds to the start of column. A sequence of head portions 452 in the x direction across the feature map all having the same Y2 location is a strong indicator of a row. A tail portion 454 is produced as a result of the fading process described above. The length of the tail portion 454 indicates the length of the text rectangle associated with the head portion. Together, the head portion 452 and tail portion 454 are indicators of start and end locations of a column.

Row processor 156 is embodied as computer programming code stored in computer memory that when executed causes a computing device to receive as input and process the unfiltered feature map produced by feature map generator 154 to output probabilities of grid locations (and their corresponding feature vectors) belonging to row canonicals. Row canonicals are pre-defined and will be determined based on the requirements of a particular application. Examples of row canonicals are 0: not a row; 1: top anchor; 2: bottom anchor; 3: end of row; 4: intermediate row. In an embodiment, row processor 156 is a convolutional neural network that has been trained to determine the spatial location of a table within a read-only document and determine the number of rows and row contents.

As an initial step, row processor 156 locates the table within the read-only document. To do this, row processor 156 uses the unfiltered feature map that corresponds to the entire read-only document. Row processor 156 determines, based on its training and using e.g. a running convolutional filter, the Y2 location of the top anchors of the table and the Y1 location of the bottom anchors of the table. FIG. 4A shows an illustration of top and bottom table anchors. In one embodiment, row processor 156 is trained using invoice line item training data and invoice header data.

Once the top and bottom anchors of the table are determined, row processor 156 reads the unfiltered feature map produced by feature map generator 154 (e.g., a map such as shown in FIG. 4C), and classifies each row of the table according to a probabilistic likelihood that the row belongs to one of the pre-defined row canonicals. The row canonical probabilities are output by row processor 156 as row-level numerical data, which may take the form of a r by g vector, where r is the number of possible row canonicals and g is the lengthwise grid dimension of the feature map.

Because row processor 156 has determined the table location within the read-only document, indicated by the y coordinates of the top and bottom anchors, the feature map can now be simplified before being processed by column processor 158. A filtering process removes all text rectangles from the feature map except for those text rectangles that lie inside the top and bottom anchors. Thus, the feature map that is passed to column processor 158 excludes all text rectangles except for those that are part of the table whose location has been identified by row processor 156. FIG. 4D shows an example of a feature map that has been filtered by the described filtering process.

Column processor 158 is embodied as computer programming code stored in computer memory that when executed causes a computing device to receive as input and process the filtered feature map produced by feature map generator 154 (using the anchor data output by row processor 156. Column processor 158 reads the filtered feature map (for example a feature map like FIG. 4D) using a running convolutional filter and outputs probabilities of grid locations (and their corresponding feature vectors) belonging to column canonicals. Column canonicals are pre-defined and will be determined based on the requirements of a particular application. Examples of column canonicals are shown in Table 1 below.

TABLE 1

Examples of Column Canonicals.

| Column Canonical |
|---|
| LineItem-LineNumber |
| LineItem-ProductID |
| LineItem-ItemName |
| LineItem-ItemDescription |

TABLE 1-continued

Examples of Column Canonicals.

Column Canonical

LineItem-Qty
LineItem-PriceExclTax
LineItem-Price InclTax

In an embodiment, column processor 158 is a convolutional neural network that has been trained to determine the number and sequential order of columns and column contents. The column canonical probabilities are output by column processor 158 as column-level numerical data, which may take the form of a c by g vector, where c is the number of possible column canonicals and g is the widthwise grid dimension of the feature map.

Table data post-processor 160 is embodied as computer programming code stored in computer memory that when executed causes a computing device to read the output of row processor 156 and column processor 158, e.g. three dimensional row and column feature probability vectors, and convert that output to a structured data format such as XML. To do this, table data post-processor 160 may utilize a mapping process by which a mapping table or file is used to determine, for instance, XML tags and syntax corresponding to particular feature data. The structured data format is a format that can be readily imported to a database system to create and store a searchable, editable data record in the database system.

Numerical data 162 is a digital data store that stores numerical data, such as the TR-level numerical data produced by document pre-processor 152 and table-level numerical data produced by feature map generator 154, row processor 156, and column processor 158.

A client portion of management system 130 and/or TES 150 may operate in user system 110, for example as a plugin or widget in a graphical user interface of a software application or as a web browser executing user interface 112. In an embodiment, a web browser may transmit a HTTP request over a network (e.g., the Internet) in response to user input (e.g., entering of a text sequence) that is received through a user interface provided by the web application and displayed through the web browser. A server portion of management system 130 and/or TES 150 may receive the input, perform at least one operation to analyze the input, and return at least one modified version of the input using an HTTP response that the web browser receives and processes.

Each of user system 110, management system 130, and TES 150 is implemented using at least one computing device that is communicatively coupled to electronic communications network 120. User system 110 is configured to communicate bidirectionally with at least management system 130, for example over network 120. Management system 130 is configured to communicate bidirectionally with at least user system 110 and TES 150, for example over network 120. Examples of communicative coupling mechanisms include inter-process communication (IPC) interfaces and application program interfaces (APIs).

The features of user system 110, management system 130, and TES 150 are implemented using computer software, hardware, or software and hardware, and may include combinations of automated functionality, data structures, and digital data, which are represented schematically in FIG. 1. User system 110, management system 130, and TES 150 are shown as separate elements in FIG. 1 for ease of discussion but the illustration is not meant to imply that separation of these elements is required. The illustrated systems and data stores (or their functionality) may be divided over any number of physical systems, including a single physical computer system, and can communicate with each other in any appropriate manner.

Structured data as used herein may refer to data values that are associated with pre-defined labels, such as metadata. Structured data may refer to the combination of one or more data values and a label. Examples of structured data include "Effective Date(09/09/1999)" and "Party(Acme, Inc.)" where the text outside the parentheses is the label, and the text within the parentheses is the data value. A data value may include any form of alphanumeric text, positive or negative integers, dates or timestamps, or real numbers, for example.

References to various different criterion herein may refer to a threshold value or threshold range of values to which data may be compared to determine whether a condition is met. In each case, the criterion is configured according to the requirements of a particular design or implementation of the system. Examples of criteria include "data value is less than or equal to x" and "data value is greater than x" and "data value is in the range of x to y," where x and y may be raw numerical values or computed values, such as percentiles or statistical or probabilistic confidence values.

The term data store as used herein may refer to any implementation of a searchable data store, including but not limited to databases, graphs, trees, and XML (eXtensible Markup Language) files. Stored data of management system 130 and/or TES 150 may reside on at least one persistent and/or volatile storage devices that may reside within the same local network as at least one other device of computing system 100 and/or in a network that is remote relative to at least one other device of computing system 100. Thus, although depicted as being included in computing system 100, stored data of management system 130 and/or TES 150 may be part of computing system 100 or accessed by computing system 100 over a network, such as network 120.

Logical connection as used in this disclosure may refer to a flow of digital information or data communication that is established between two devices on a network by network software communicating with, for example, the devices' operating systems either directly or by a virtual machine. Examples of protocols that may be used to establish a logical connection include hypertext transfer protocol (HTTP) and secure sockets layer (SSL).

Network 120 may be implemented on any medium or mechanism that provides for the exchange of data, signals, and/or instructions between sub-systems 110, 130, 150, 170 of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Example Table Extraction Process

Figure 2A:
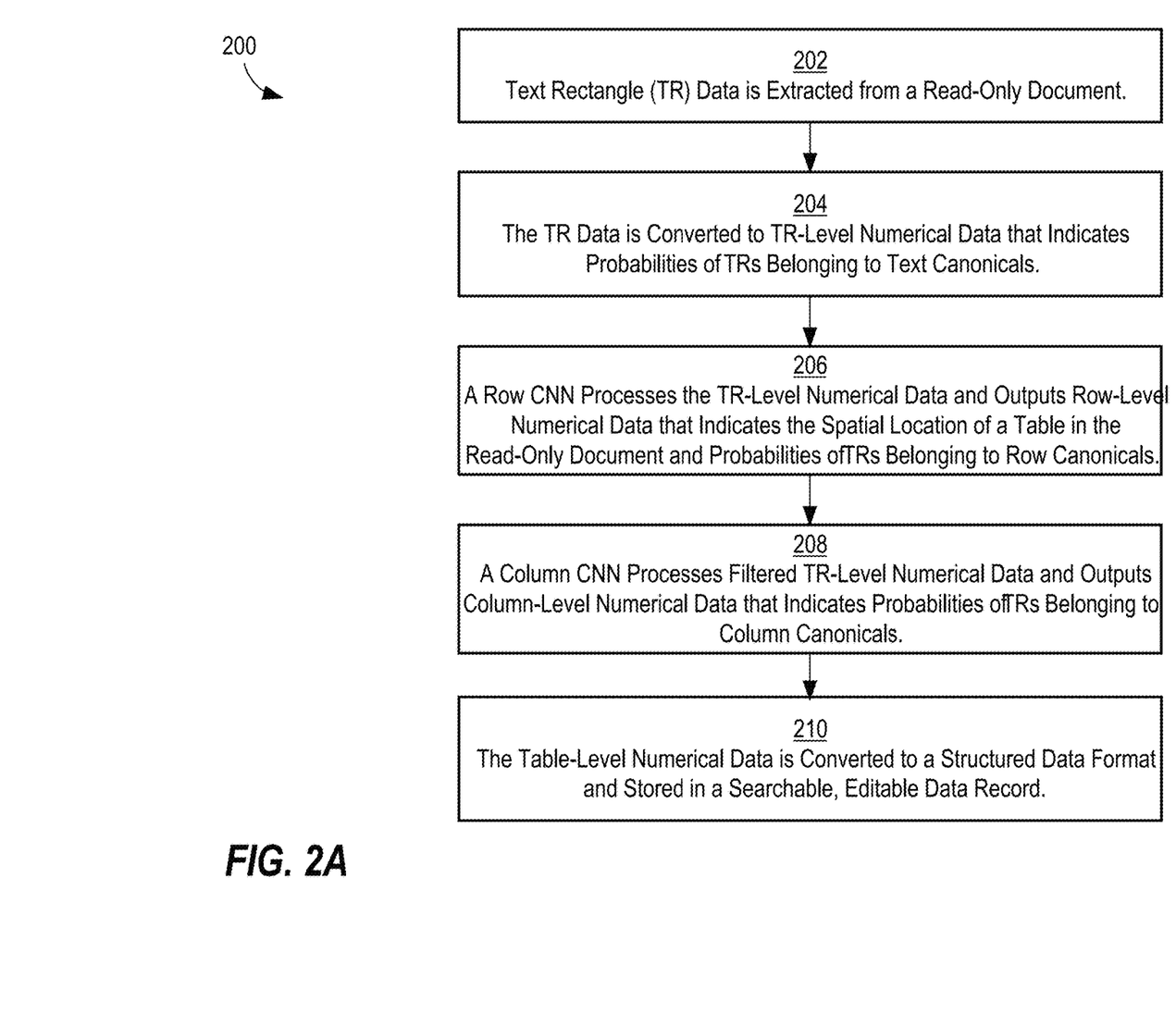
FIG. 2A is a flow diagram of a process that may be executed by at least one device of the computing system of FIG. 1.

FIG. 2A is a simplified flow diagram of an embodiment of operations that can be performed by at least one device of a computing system. The operations of a flow 200 as shown in FIG. 2A can be implemented using processor-executable instructions that are stored in computer memory. For purposes of providing a clear example, the operations of FIG. 2A are described as performed by computing system 100, but other embodiments may use other systems, devices, or implemented techniques.

In flow 200, operation 202 extracts text rectangle (TR) data from a read-only document. Operation 202 includes, for example, functions and processes described above as being performed by document pre-processor 152.

Operation 204 converts the TR data obtained by operation 202 to TR-level numerical data that indicates probabilities of text rectangles belonging to text canonicals. Operation 204 includes, for example, functions and processes described above as being performed by feature map generator 154. In an embodiment, operation 204 comprises both classification of TR data into label or not a label and further classification into respective label and value canonical probabilities via by document preprocessor 152, and generating a feature map via feature map generator 154.

In operation 206, a row convolutional neural network (CNN) processes the TR-level numerical data produced by operation 204 and outputs row-level numerical data that indicates the spatial location of a table in the read-only document and probabilities of text rectangles belonging to row canonicals. Operation 206 includes, for example, functions and processes described above as being performed by row processor 156.

In operation 208, a column CNN processes filtered TR-level numerical data produced using the output of operation 206 and a filtering process, and outputs column-level numerical data that indicates probabilities of text rectangles belonging to column canonicals. Operation 208 includes, for example, the above described filtering process and other functions and processes described above as being performed by column processor 158.

Operation 210 converts the table-level numerical data output by operation 206 and operation 208 to a structured data format and stores the formatted data in a searchable, editable data record. Operation 210 includes, for example, the above described filtering process and other functions and processes described above as being performed by table data post-processor 160.

Example Table Extraction System

Figure 2B:
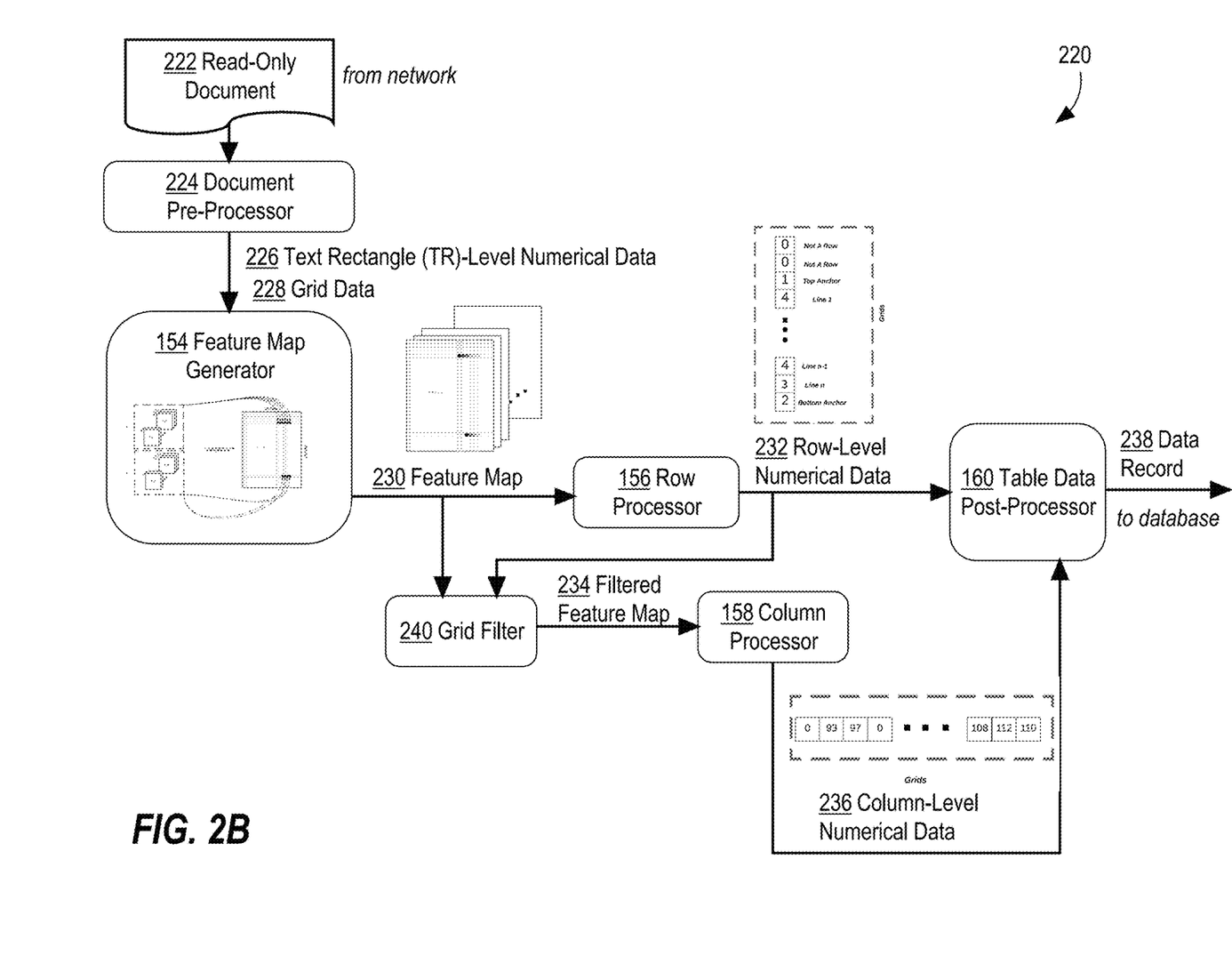
FIG. 2B is a flow diagram of a process that may be executed by at least one device of the computing system of FIG. 1.

FIG. 2B is a simplified flow diagram of an embodiment of operations that can be performed by at least one device of a computing system. The operations of a flow 220 as shown in FIG. 2B can be implemented using processor-executable instructions that are stored in computer memory. For purposes of providing a clear example, the operations of FIG. 2B are described as performed by computing system 100, but other embodiments may use other systems, devices, or implemented techniques.

In flow 220, a read only document 222 is received from a network and ingested by document pre-processor 224, described above. Document pre-processor processes read-only document 222 using, for example, a group of small neural networks, and outputs text rectangle (TR)-level numerical data 226 and grid data 228. TR-level numerical data 226 includes, for example, x-y coordinates and contents of text rectangles extracted from read-only document 222 and probabilities of contents of text rectangles belonging to text canonicals such as label or value. Grid data 228 includes, for example, grid and grid cell pixel dimensions.

TR-level numerical data 226 and grid data 228 are ingested by feature map generator 154, described above. Feature map generator 154 projects TR-level numerical data 226 onto a grid defined by grid data 228 and outputs feature map 230.

Feature map 230 is ingested by row processor 156, described above. Row processor 156 processes feature map 230 using, for example, a running convolutional filter, and outputs row-level numerical data 232. Row-level numerical data 232 indicates top and bottom anchors of a table contained in read-only document 222 and probabilities of each row of the identified table belonging to a set of possible row canonicals.

The y coordinates of the anchor data produced by row processor 156, as well as the unfiltered feature map 230, are ingested by grid filter 240. Grid filter 240 uses the anchor data to remove from feature map 230 all text rectangle data that falls outside of the table portion of read-only document 222 as defined by the anchor data. Grid filter 240 outputs the filtered feature map 234.

Filtered feature map 234 is ingested by column processor 158, described above. Column processor 158 processes filtered feature map 234 using, for example, a running convolutional filter, and outputs column-level numerical data 236. Column-level numerical data 236 indicates probabilities of each column of the identified table belonging to a set of possible column canonicals.

Table data post-processor 160, described above, ingests row-level numerical data 232 and column-level numerical data 236, converts the data 232, 236 to a structured data format, creates a searchable, editable data record 238, and stores the data record 238 in a database.

Example Process for Feature Map Creation

Figure 3A:
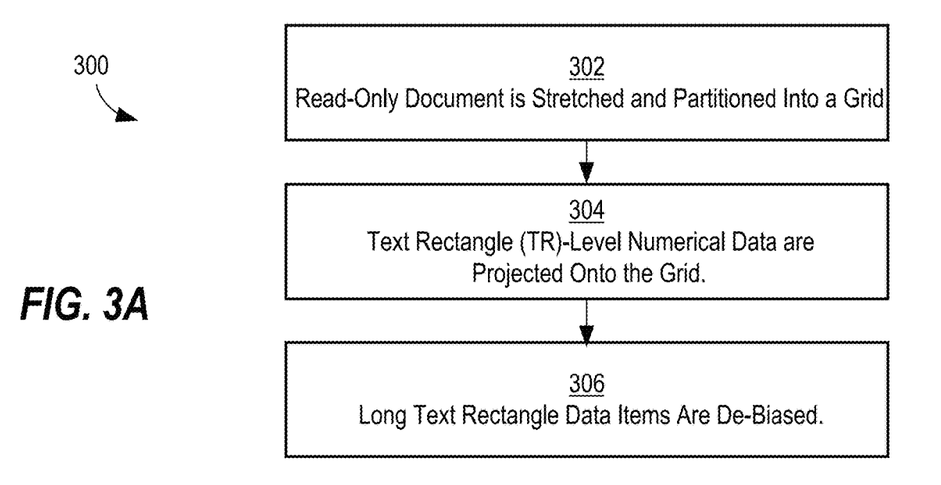
FIG. 3A and FIG. 3B are flow diagrams of processes that may be executed by at least one device of the computing system of FIG. 1.

FIG. 3A is a simplified flow diagram of an embodiment of operations that can be performed by at least one device of a computing system. The operations of a flow 300 as shown in FIG. 3A can be implemented using processor-executable instructions that are stored in computer memory. For purposes of providing a clear example, the operations of FIG. 3A are described as performed by computing system 100, but other embodiments may use other systems, devices, or implemented techniques.

Figure 3B:
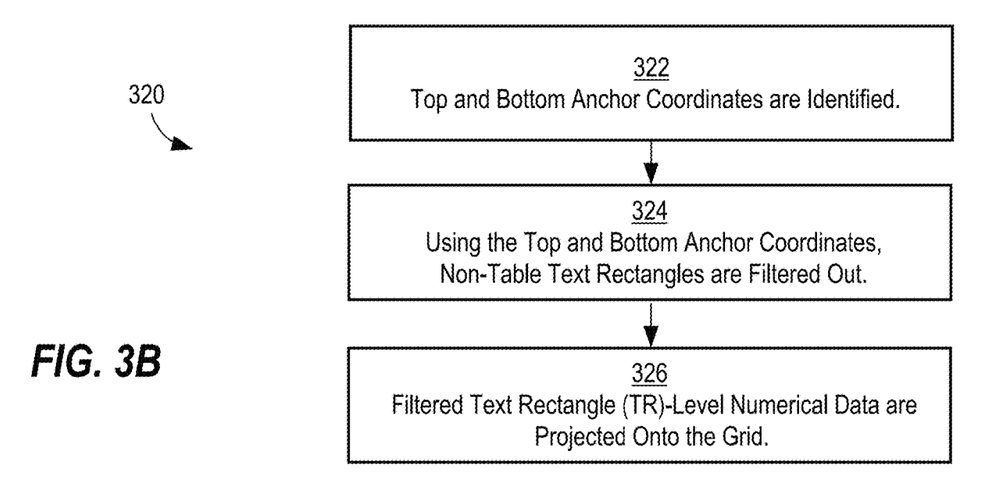

In flow 300, operation 302 stretches a read-only document, such as read-only document 222, defines a grid, and partitions the read-only document into the grid. In operation 304, text rectangle (TR)-level numerical data are projected onto the grid defined in operation 302. In operation 306, long text rectangle data items are de-biased. De-biasing means that the effect of the feature weights associated with the long text rectangle data items on the overall TR-level numerical data is reduced using a fading process such as an exponential smoothing or weight decay function, as discussed above. Portions of flow 300 may be implemented as described above with reference to feature map generator 154. Operation 306 outputs an unfiltered feature map, which may be ingested, for example, by row processor 156. An example of an unfiltered feature map is shown in FIG. 4C, described above Example Process for Filtering a Feature Map FIG. 3B is a simplified flow diagram of an embodiment of operations that can be performed by at least one device of a computing system. The operations of a flow 320 as shown in FIG. 3B can be implemented using processor-executable instructions that are stored in computer memory. For purposes of providing a clear example, the operations of FIG. 3B are described as performed by computing system 100, but other embodiments may use other systems, devices, or implemented techniques.

In flow 320, operation 322 identifies the y coordinates of top and bottom anchors of a table contained in a read-only document. Portions of flow 320 may be implemented as described above with reference to row processor 156.

Operation 324 ingests the anchor data produced by operation 322 and, using the anchor data, determines the table location in the read-only document and filters all non-table text rectangle data out of the TR-level numerical data that has been produced by, for example, document pre-processor 152 as describe above. Portions of operation 324 may be performed by grid filter 240, described above.

In operation 326, the filtered TR-level numerical data produced by operation 324 is projected onto a grid, for example a grid having the same configuration as the grid used to produce the unfiltered feature map in flow 300, described above. Operation 326 outputs the filtered feature map, which may be ingested, for example, by column processor 158. An example of a filtered feature map is shown in FIG. 4D, described above.

Implementation Example—Hardware Overview

According to one embodiment, the techniques described herein are implemented by at least one special-purpose computing device. The special-purpose computing device may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, mobile computing devices, wearable devices, networking devices or any other device that incorporates hard-wired and/or program logic to implement the techniques.

Figure 5:
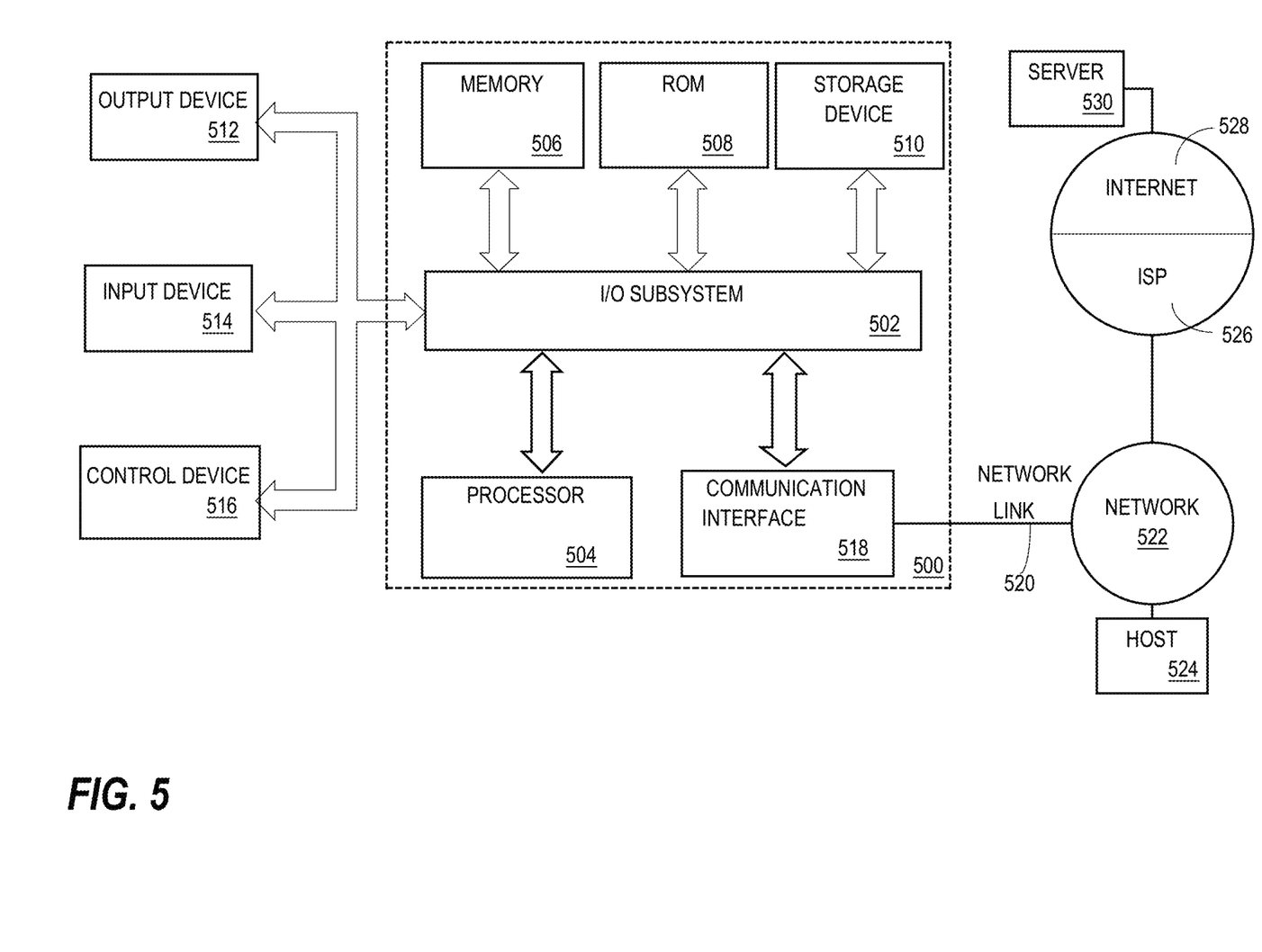
FIG. 5 is a block diagram illustrating an embodiment of a hardware system, which may be used to implement various aspects of the computing system of FIG. 1.

For example, FIG. 5 is a block diagram that illustrates a computer system 500 upon which an embodiment of the present invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 and further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, at least one ASIC or FPGA, firmware and/or program logic which in combination with the computer system causes or programs computer system 500 to be a special-purpose machine. According to one embodiment, the techniques herein are performed by computer system 500 in response to processor 504 executing at least one sequence of instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying at least one sequence of instruction to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated-services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through at least one network to other data devices. For example, network link 520 may provide a connection through local network 522 to a host computer 524 or to data equipment operated by an Internet Service Provider (ISP) 526. ISP 526 in turn provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

EXTENSIONS AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

Various features of the disclosure have been described using process steps. The functionality/processing of a given process step potentially could be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features mentioned or evident from the text or drawings. These different combinations constitute various alternative aspects of the embodiments.

What is claimed is:

1. A computer-implemented method, comprising:
   extracting text rectangle (TR)-level numerical data and grid data from a digital electronic document using one or more neural networks;
   generating a feature map by projecting the TR-level numerical data onto a grid defined by the grid data and de-biasing one or more long text rectangle data items of the TR-level numerical data;
   generating row-level numerical data by processing the feature map using a first-running convolutional filter;
   generating a filtered feature map by filtering the feature map using a grid filter;
   generating column-level numerical data by processing the filtered feature map using a second-running convolutional filter; and
   converting the row-level numerical data and the column-level numerical data to a structured data format.

2. The computer-implemented method of claim 1, wherein the TR-level numerical data indicates one or more probabilities of contents of text rectangles belonging to one or more text canonicals.

3. The computer-implemented method of claim 2, wherein the one or more text canonicals comprises a label or a value.

4. The computer-implemented method of claim 1, wherein the row-level numerical data indicates top anchors and bottom anchors of a table contained in the digital electronic document.

5. The computer-implemented method of claim 4, wherein the row-level numerical data indicates probabilities of each row of the table belonging to a set of row canonicals.

6. The computer-implemented method of claim 1, wherein the grid filter uses anchor data to determine a table location in the digital electronic document.

7. The computer-implemented method of claim 6, wherein the TR-level numerical data is associated with TR data of the digital electronic document, and wherein the grid filter filters all non-table TR data out of the TR-level numerical data.

8. The computer-implemented method of claim 1, wherein the column-level numerical data indicates probabilities of each column of a table belonging to a set of column canonicals.

9. The computer-implemented method of claim 1, wherein the structured data format is stored in a searchable and editable data record.

10. The computer-implemented method of claim 2, wherein the de-biasing comprises reducing an effect of one or more feature weights associated with the one or more long text rectangle data items on the TR-level numerical data.

11. One or more non-transitory computer-readable storage media, storing instructions which, when executed, cause one or more processors to execute:
    extracting text rectangle (TR)-level numerical data and grid data from a digital electronic document using one or more neural networks;
    generating a feature map by projecting the TR-level numerical data onto a grid defined by the grid data and de-biasing one or more long text rectangle data items of the TR-level numerical data;
    generating row-level numerical data by processing the feature map using a first-running convolutional filter;

generating a filtered feature map by filtering the feature map using a grid filter;

generating column-level numerical data by processing the filtered feature map using a second-running convolutional filter; and converting the row-level numerical data and the column-level numerical data to a structured data format.

12. The one or more non-transitory computer-readable storage media of claim 11, wherein the TR-level numerical data indicates one or more probabilities of contents of text rectangles belonging to one or more text canonicals.

13. The one or more non-transitory computer-readable storage media of claim 12, wherein the one or more text canonicals comprises a label or a value.

14. The one or more non-transitory computer-readable storage media of claim 11, wherein the row-level numerical data indicates top anchors and bottom anchors of a table contained in the digital electronic document.

15. The one or more non-transitory computer-readable storage media of claim 14, wherein the row-level numerical data indicates probabilities of each row of the table belonging to a set of row canonicals.

16. The one or more non-transitory computer-readable storage media of claim 11, wherein the grid filter uses anchor data to determine a table location in the digital electronic document.

17. The one or more non-transitory computer-readable storage media of claim 16, wherein the TR-level numerical data is associated with TR-data of the digital electronic document, and wherein the grid filter filters all non-table TR data out of the TR-level numerical data.

18. The one or more non-transitory computer-readable storage media of claim 11, wherein the column-level numerical data indicates probabilities of each column of a table belonging to a set of column canonicals.

19. The one or more non-transitory computer-readable storage media of claim 11, wherein the structured data format is stored in a searchable and editable data record.

20. The one or more non-transitory computer-readable storage media of claim 12, wherein the de-biasing comprises reducing an effect of one or more feature weights associated with the one or more long text rectangle data items on the TR-level numerical data.

* * * * *